Dec. 6, 1955   C. ODLE   2,725,675
PLANT COVER
Filed Aug. 8, 1950

Catherine Odle
INVENTOR.

BY *Clarence A. O'Brien and Harvey B. Jacobson*
Attorneys

United States Patent Office 2,725,675
Patented Dec. 6, 1955

2,725,675

PLANT COVER

Catherine Odle, Appleton City, Mo.

Application August 8, 1950, Serial No. 178,302

2 Claims. (Cl. 47—27)

This invention relates to a shield or cover for growing plants the primary object of which is to provide a ventilated, transparent coniform plant cover with a moisturizing unit to protect and accelerate the growth of the plants.

Another important object of this invention is to provide a cover of the character described which will provide a fresh, buoyant, draft-free environment which will impart a vigorous, rapid growth to the plants from which the grower may realize a several weeks gain.

A still further object of this invention is to provide a cover of the character described including a base unit to allow an adjustment of the height of the cover during the growth period of the plants.

A further object of this invention is to provide a plant cover which is relatively simple in design and construction, attractive, easy to use, and very efficient for its intended purpose. With this cover the plant endures hardships to a greater degree as it matures, bringing about better yield and better quality. For example, if celery is grown by this method, the gardener living in hot, dry sections who is not able ordinarily to grow this vegetable can do so with a minimum of labor. Gardeners who desire to grow fall gardens may do so by starting cabbages, lettuce, cauliflower, etc., with the use of the covers during the late hot summers. The plants will then be ready to mature outside the covers when the cooler fall weather and fall rains appear.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification similar reference characters indicate corresponding elements throughout.

Figure 1:
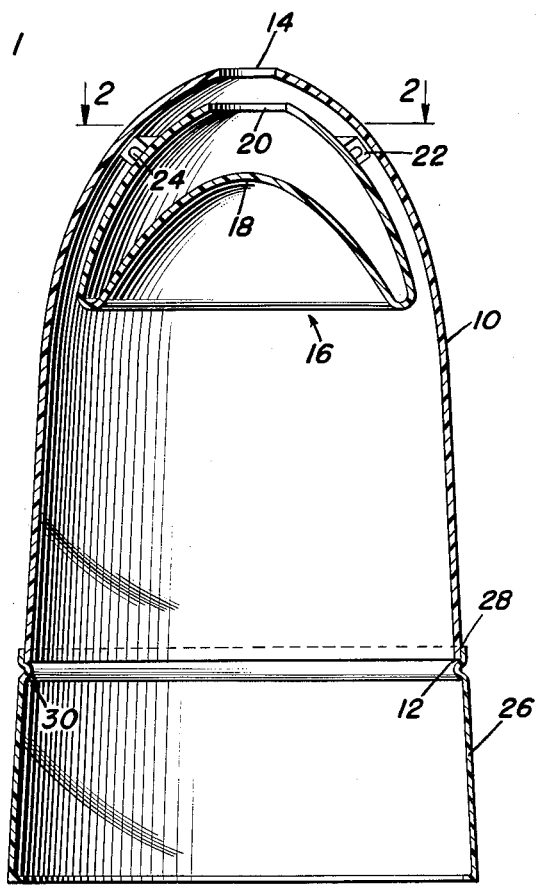
Figure 1 is a vertical sectional view through the cover.

The present plant cover is a hollow coniform body 10 which is fabricated of a transparent plastic, glass or similar material. The lower end is open as at 12 whereas the upper end includes a central aperture 14 which is approximately one inch in diameter.

The moisturing unit is generally indicated at 16 and is a coniform transparent container, the bottom end of which is indented as at 18 to accommodate the plants as they grow. The upper end of the container 16 is provided with a central aperture 20 somewhat larger in diameter than the central aperture 14.

A means is provided for removably securing the moisturizing or water-containing unit 16 inwardly of the outer coniform body or shield 10 which means comprises a plurality of U-shaped or channel members 22 secured to the inner surface of the cover or shield 10 adjacent the upper end thereof and circumferentially spaced. Secured to the outer surface of the annular wall of the water container 16 adjacent its upper end is a plurality of circumferentially spaced, laterally extending lugs or ribs 24 which are adapted to be received within the U-shaped or channel members 22 as shown clearly in Figure 1. The water container 16 can be secured to the inner surface of the outer cover or container 10 by a screwing or threading action as will be readily understood.

To extend the height of the cover, a base member 26 is provided in the form of a tubular member which has an upper end 28 which is somewhat wider in diameter than the lower open end of the cover 10. Adjacent the upper end 28 of the tubular base member 26, the same is provided with an annular, inwardly directed bead 30 which is adapted to serve as a ledge for supporting the bottom open free edge of the coniform cover 10 as shown in Figure 1.

Figure 3:
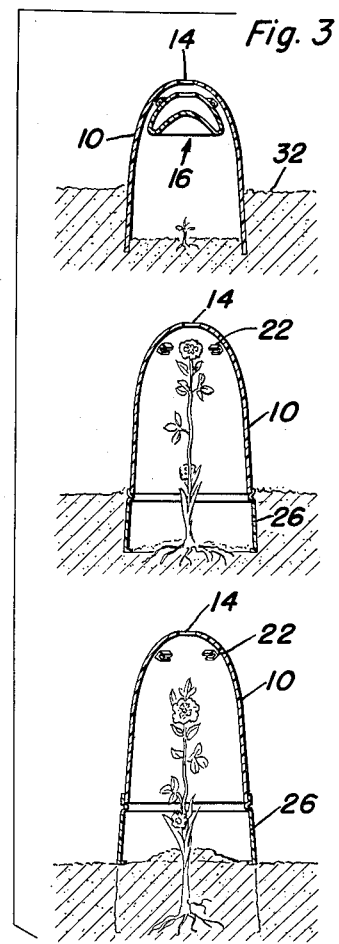
Figure 3 is a diagrammatic view, parts being shown in vertical section illustrating the height adjustment of the cover.
Figure 2:
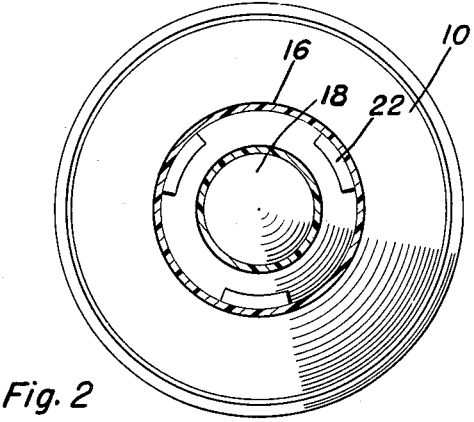
Figure 2 is a sectional view taken substantially on a plane of section line 2—2 of Figure 1.
Figure 4:
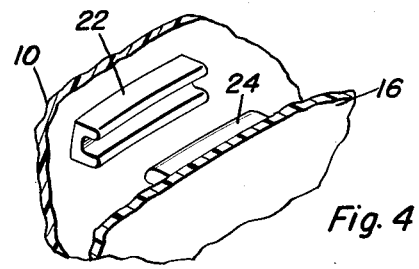
Figure 4 is a fragmentary perspective view of the means for removably retaining the moisturizing unit within the outer shield.

In use, the cover is placed around the seeds or plants that have been placed four or five inches below the level of the ground 32 as shown clearly in the upper portion of Figure 3. The lower four or five inches of the cover is put into the depression in the ground and the soil pressed firmly down around the cover. Of course, water is placed in the container 16. When the plant growth reaches the container 16, the cover 10 is removed and the water container is taken out of the cover. The base member 26 is inserted in the depression in the ground and the cover 10 is positioned on the base member as shown clearly in the immediate drawing in Figure 3. When the plant growth reaches the top of the cover, the cover is removed and the soil pulled in around the plants then to ground level and the cover with the base member 26 is replaced over the plants with the entire unit resting on top of the ground as shown clearly in the bottom drawing of Figure 3. If the temperature is very hot or very cold, some soil may be pulled around the base member 26 to further insulate the plants.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A plant cover comprising a substantially coniform transparent housing having an aperture in its top, and an open bottom, the wall portion of said housing at said bottom adapted to penetrate the ground, and a substantially coniform water container mounted in the upper portion of the housing in spaced, concentric relation thereto and having an opening in its top in registry with the first named opening, said container including a substantially coniform bottom extending in spaced, opposed relation to the walls of said container to accommodate plants as they grow.

2. A plant cover comprising a substantially coniform transparent housing having an aperture in its top, and an open bottom, the wall portion of said housing at said bottom adapted to penetrate the ground, a substantially coniform water container mounted in the upper portion of the housing in spaced, concentric relation thereto and having a comparatively large opening in its top in registry with the first named opening, a plurality of spaced channel members mounted circumferentially in the upper portion of the housing, and a plurality of spaced, circumferential ribs on the container slidable longitudinally into the channel members for removably securing the container in the housing, said container including a substantially coniform bottom extending in spaced, opposed relation to the walls of said container to accommodate plants as they grow.

References Cited in the file of this patent

UNITED STATES PATENTS

| | | |
|---|---|---|
| 153,715 | Landers | Aug. 4, 1874 |
| 715,571 | Gillinder | Dec. 9, 1902 |
| 1,254,260 | Mueller | Jan. 22, 1918 |
| 2,181,016 | Gross | Nov. 21, 1939 |
| 2,226,812 | Goldberg | Dec. 31, 1940 |

FOREIGN PATENTS

| | | |
|---|---|---|
| 9,840 | Great Britain | May 17, 1893 |
| 808,394 | Germany | July 12, 1951 |